Aug. 30, 1938.　　　　E. O. SCHJOLIN　　　　2,128,328
CONTROL MECHANISM
Filed July 1, 1936　　　3 Sheets-Sheet 1

Inventor
Eric Olle Schjolin

Aug. 30, 1938.  E. O. SCHJOLIN  2,128,328
CONTROL MECHANISM
Filed July 1, 1936  3 Sheets-Sheet 2
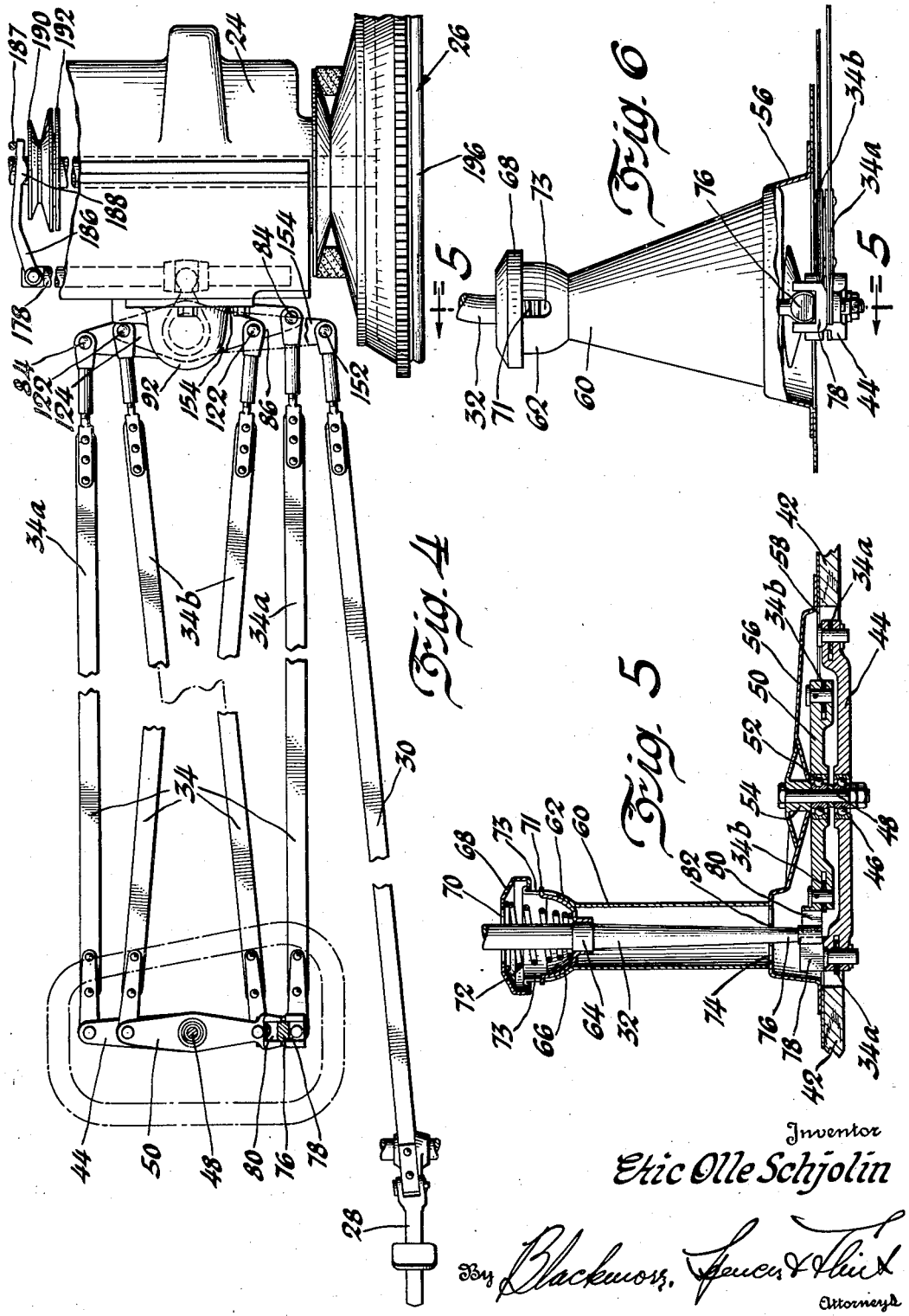
Inventor
Eric Olle Schjolin
By Blackmore, Spencer & Flint
Attorneys Aug. 30, 1938.  E. O. SCHJOLIN  2,128,328
CONTROL MECHANISM
Filed July 1, 1936  3 Sheets-Sheet 3
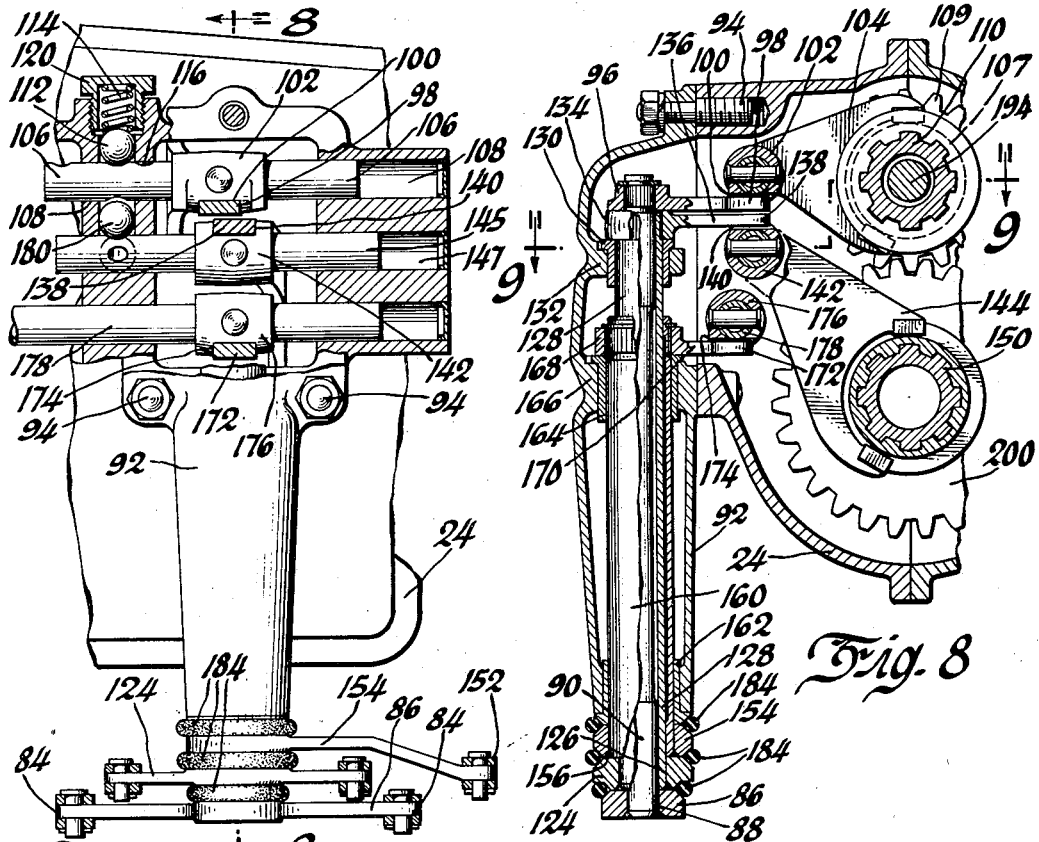
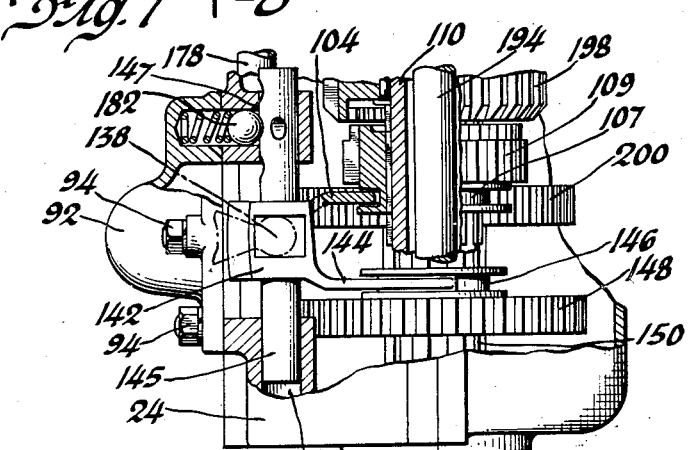
Inventor
Eric Olle Schjolin
By Blackmore, Spencer & Flint
Attorneys Patented Aug. 30, 1938

2,128,328

UNITED STATES PATENT OFFICE 2,128,328

CONTROL MECHANISM

Eric Olle Schjolin, Pontiac, Mich., assignor to General Motors Corporation, Detroit, Mich., a corporation of Delaware Application July 1, 1936, Serial No. 88,318

12 Claims. (Cl. 192—3.5)

This invention relates to automotive vehicles and has particular reference to means for operating the clutch and the gear transmission associated with an internal combustion engine positioned at the rear of the vehicle.

In present practice where the engine is positioned at the front of the vehicle and the matter of operating the controls such as the shifting of the gears of transmission or of disengaging the clutch has offered no serious problem. However, where the engine, the clutch and the transmission are positioned at the rear of the vehicle, or specifically over the rear axle, and the controls or operating levers are at the front seat where they are accessible to the driver, the problems are more difficult. Where the transmission is at the rear of the vehicle, it has been found that it is desirable to make a more compact construction, particularly in the case of light vehicles where the engine block and transmission housing are cast as a unit. In the present invention, the transmission is positioned in a direction transversely of the vehicle instead of longitudinally as in prior practice, and this transverse positioning offered additional problems.

The transmission associated with the invention is of the usual gear type having one shiftable gear to operate the transmission in low and reverse and a second shiftable gear to cause the transmission to operate in second and high. The two shiftable gears are operated by the usual forks which are operated from concentric tubes positioned in a housing or box fastened to the side of the transmission housing. The clutch operating tube is likewise positioned in the same box concentric with the transmission operating tubes. All of the operating tubes (three in number) project downwardly out of the box and have attached at their ends, arms which in turn are connected by metal ribbons to the shifter means for the transmission and to a pedal for operating the clutch at the front of the vehicle. The ribbons are passed from the rear to the front through grooves in the floor board, the grooves being covered by metal strips to maintain a level and rigid floor.

On the drawings:—

Figure 4 is an enlarged detailed plan view of the operating ribbons and their interconnected parts.

Figure 5 is a section through the dome on the axis of the shift lever taken on the line 5—5 of Figure 6.

Figure 6 is a view of the structure of Figure 5 looking from the left.

Figure 7 is a front elevational view of the box or housing secured to the transmission and housing the operating tubes, with the upper portion broken away to show the gear and clutch shifter rods.

Figure 8 is a sectional view on the line 8—8 of Figure 7.

Figure 9 is a sectional detailed view on the line 9—9 of Figure 8.

Figure 1:
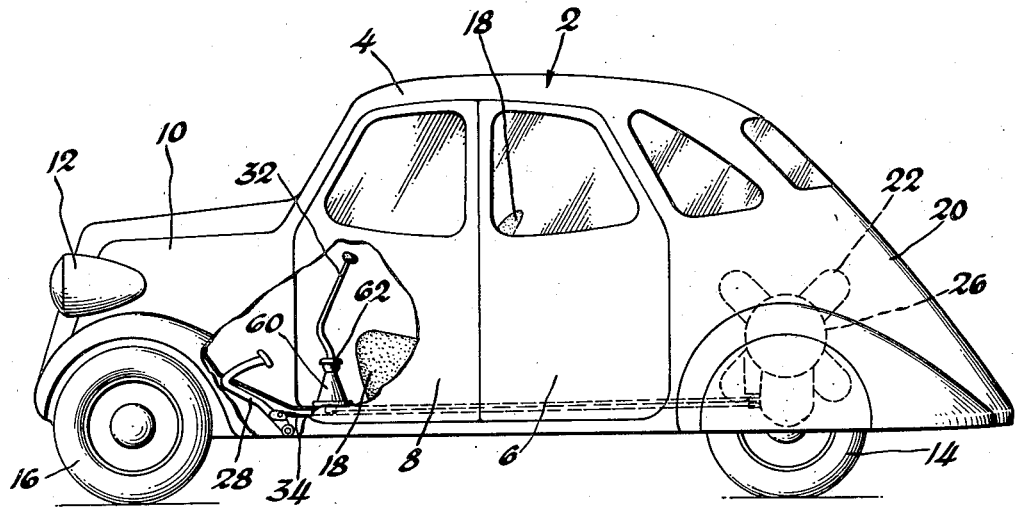
Figure 1 is a side view of an automotive vehicle with parts broken away and shown in section and illustrating the application of the invention.
Figure 2:
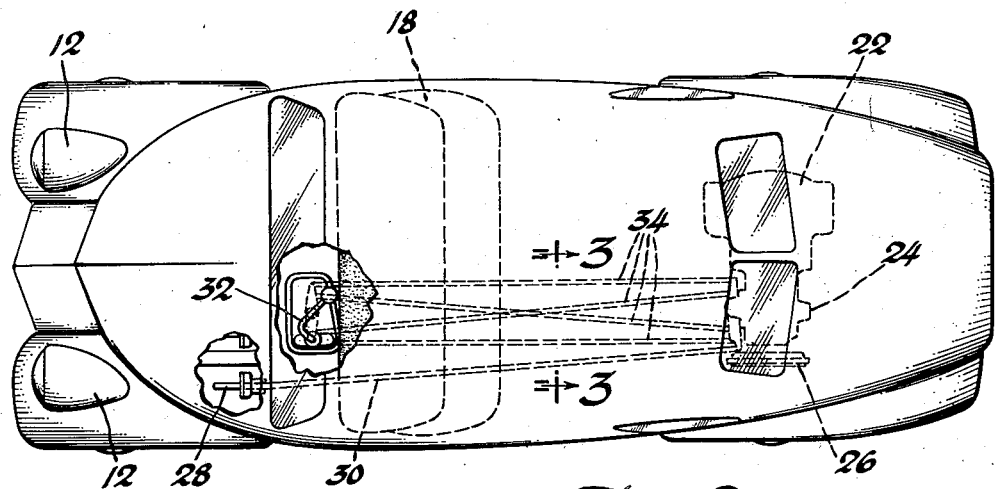
Figure 2 is a plan view of the vehicle of Figure 1 with parts broken away better to illustrate the construction.
Figure 3:
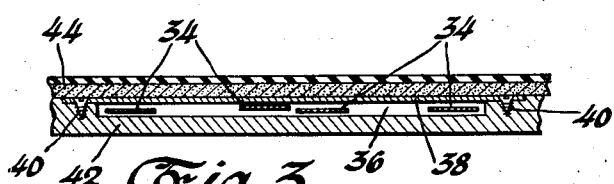
Figure 3 is a section on the line 3—3 of Figure 2 through the floor board showing the manner of housing the ribbons for operating the transmission.

Referring to the drawings, numeral 2 indicates an automotive vehicle as a whole and of the type shown in my co-pending application S. N. 41,062. The top is indicated at 4, the rear door at 6, the front door at 8, the front compartment at 10, head lamps at 12, the rear wheels at 14 and the front wheels at 16. The vehicle is provided with the usual front seat 18 and the rear deck 20. The engine of the vehicle is positioned at the rear and is indicated at 22. The engine has integrally formed therewith, the transmission housing 24 which houses the gears of the usual gear type transmission. The clutch is indicated at 26 and is operated from the clutch pedal 28 at the front of the vehicle through the intermediary of the ribbon 30. The gears of the transmission are shifted from the gear shift lever 32 which is likewise positioned at the front of the vehicle and operates the ribbons 34 which are interconnected with the gears of transmission as will be later described. The ribbons 34 are transmitted from the transmission 24 at the rear to the lever 32 at the front by forming a groove 36 in the floor board and covering the groove by the plate 38 which is fastened by means of the screws 40 to the floor board 42. The floor board and the plate are suitably covered by the floor covering material 44. A similar but smaller groove is used for the ribbon 30.

Referring to Figure 4, it will be noted that the transmission ribbons 34 comprise an outer pair 34a and an inner pair 34b. The pair 34a are connected at their front to the ends of a lever 44 pivoted at its center in the ball bearing 46 on a shaft 48. The pair of ribbons 34b are connected at the front end to the ends of a shorter lever 50 pivoted at its center in a ball bearing 52 likewise mounted on the shaft 48. In the neutral position of the transmission, the levers 44 and 50 are positioned over each other as shown in Figures 5 and 6.

The shaft 48 is mounted in a hub 54 rigidly mounted in a base plate 56 secured to the floor 42 in any suitable way and covering an opening 58 therein. The base plate 56 has secured thereto the upright dome 60 hemispherically shaped as at 62 at its top and adapted to receive therein the gear shift lever 32. The lever has secured thereto at an enlarged portion 64, a hemispherically shaped element 66 which cooperates with the hemispherically shaped part 62. A cap 68 fits over and is secured to the top of the dome and has an opening 70 to enable the lever 32 to pass therethrough. A conical coil spring 72 is held between the cover 70 and the bottom of the element 66 and holds the element 66 on its seat in part 62. Tongues 71 guided in slots 73 guide the element 66.

The lower portion of the dome has the usual H slot at 74 properly to guide the lower end 76 of the lever. The end 76 is rounded as shown in Figure 6 and is adapted to be shifted to be received in either the yoke 78 on the lever 44 or the yoke 80 on the lever 50. In the position of the lever as shown in Figure 5, it is incapable of moving either of the levers 44 or 50 because it is in engagement with the fingers 82 of the H slot. By shifting the lever in the plane of the paper, either to the right or the left, the end 76 may be caused to be engaged in either of the yokes 78 or 80 and also remove the shank of the lever into the open side of the H slot so that the lever may now be moved to swing either the lever 44 or the lever 50 depending on whether the end 76 has been shifted into the slot 78 or 80. The swinging of the lever 44 for example, will cause the movement of the ribbons 34a to shift the gears of the transmission 24 as will be later described.

The rear ends of the ribbons 34a are connected at 84 to the extremity of an arm 86 which in turn is secured at its middle as at 88 to a tube or rod 90 which extends vertically upward in a housing or box 92 secured by means of the bolts 94 to the sides of the transmission casing 24. The tube 90 has secured to its upper end the lever arm 96, the end 98 of which is received in a recess 100 in a hub 102 of a shifter fork 104, the hub being secured to a shifter rod 106 mounted in passages 108 in the transmission housing. The fork 104 engages in a groove 107 formed on a shiftable gear 109 slidable on a shaft 110 in the transmission housing. Referring to the upper left hand corner of Figure 7, a retainer ball 112 is pressed by a spring 114 into one of the notches 116 on the shifter rail 106 to hold the gear 109 in its shifted position. The spring is retained in position by means of the hollow cap 120 screw-threaded to the top of the transmission housing.

The ribbons 34b are connected at the rear ends as at 122 to a lever 124 which is positioned over the lever 86 but is considerably shorter. The lever 124 is secured at its center as at 126 to a tube 128 which is concentric with and fits around the tube or rod 90 and extends coincident therewith in the housing 92 to substantially the end of the tube 90. At its upper end the tube 128 is mounted in a bearing 130 positioned in a partition 132 in a box or housing 92. From an inspection of Figure 8, it will be apparent that the tube 128 forms the bearing for the tube 90.

At the upper end of the tube 128 there is secured the hub 134 of a lever 136, the end 138 of which is received in a notch 140 in the hub 142 of a second shifter fork 144. The hub 142 is rigidly secured to the shifter rail 145 slidable in passages 147 in the transmission housing. The fork 144 engages in a groove 146 formed on a shiftable gear 148 slidable on the shaft 150 in a transmission housing.

Referring to Figure 8, it will be noted that the hub 134 rests on the bearing 130 and the hub 96 in turn rests on the hub 134 so that the tubes 90 and 128 mutually aid each other in forming bearing surfaces, the one for the other.

The ribbon 30 to operate the clutch is attached at its rear end as at 152 to a lever 154. The lever 154 is secured at its end as at 156 to a third tube 160 which has its lower end mounted in a bearing 162 positioned in the lower extremity of the box 92 and at its upper end mounted in a second bearing 164 mounted in a partition 166 in the box 92. The upper extremity of the tube 160 has secured thereto a hub 168 of a lever 170, the end 172 of which is received in a notch 174 formed in a hub 176 secured to the clutch shifter rail 178.

Referring then to Figure 8, it will be apparent that the outer clutch tube 160 forms the bearing for the second or gear shift tube 128 and that the tube 128 in its turn forms the bearing for the innermost gear shifting tube 90 so that there is a definite relation between the clutch and gear shifting mechanisms.

By referring to Figure 7, it will be noted that an interlock ball 180 is positioned between the shifter rails 106 of the fork 104 and the rail 145 for the fork 144. The ball is received in the usual notches to prevent the shifting of one rail while the gear interrelated with the other is in interengagement with the transmission gears.

In Figure 9 there is shown at 182 a ball detent similar to the ball detent 112, 114 and having the same function but with reference to the shifter rail 145.

In Figures 7 and 8 it will be noted that rubber grommets 184 are positioned around the joints between the two ends where the levers are secured thereto. These grommets are for the purpose of excluding dust and water.

Referring to Figure 4, the clutch shifter rail 178 is shown as extending a considerable distance in the transmission housing and at its end has pivotally secured thereto, the clutch shifter fork 186. This fork is fulcrumed on a pin 187 and has the tooth 188 which presses against the plate 190 to compress a plurality of Belleville washers 192. When the clutch pedal is depressed the lever end attached to the shifter rod 178 will pull the lever downwardly when considering Figure 4 to compress the Belleville washers and move the quill shaft 194 (Figure 9) to shift the shiftable member 196 of the clutch. The clutch and its operation is better shown and described in my co-pending application S. N. 55,626.

Referring to Figure 9, it will be apparent that the shifting of the gear 109 toward the top of the sheet will cause it to engage with the gear 198 while shifting toward the bottom of the sheet will cause it to engage with the gear 200 to give either high or second speeds. The shifting of the gear 148 will cause it to engage either with an idler gear to give reverse or with another gear of the transmission to give low speed in a conventional and well known manner.

I claim:

1. In an operating means for the transmission and clutch of an automotive vehicle having an engine, a clutch and a gear transmission at the rear of the vehicle and operating levers for the transmission and clutch at the front of the vehicle, a housing positioned at the transmission, a plurality of concentric clutch and gear operators in the housing, said operators mutually forming bearings for each other means independently connected to the levers and to each operator to move the operators, and means optionally engageable by the gear operating lever selectively to operate any one of said gear operators to shift the gears of the transmission.

2. In an operating means for the transmission and clutch of an automotive vehicle having an engine, a clutch and a gear transmission at the rear of the vehicle and operating levers for the transmission and clutch at the front of the vehicle, a housing positioned at the transmission, a plurality of concentric clutch and gear operators in the housing, said operators mutually forming bearings for each other arms on each of said operators, means independently connected to each lever and to each of the arms to move the arms, and means optionally engageable by the gear operating lever selectively to operate any one of said gear operators to shift the gears of the transmission.

3. In an operating means for the transmission and clutch of an automotive vehicle having an engine, a clutch and a gear transmission at the rear of the vehicle and operating levers for the transmission and clutch at the front of the vehicle, a housing positioned at the transmission, a plurality of concentric clutch and gear operators in the housing, arms on the end of each of said operators, a plurality of ribbons, one ribbon connected to the end of each of the arms and extending to the levers, and means connected to the ends of the ribbons and engageable by the gear operating lever to be moved thereby selectively to shift the gears of the transmission.

4. In an operating means for the transmission of an automotive vehicle having an engine and a gear transmission at the rear of the vehicle and a shifter lever for the transmission at the front of the vehicle, a housing secured to the transmission, a plurality of gear operators in the housing, means in the housing to mount the operators, arms independently connected at their centers to the operators to enable the independent operation of one operator with respect to the other, ribbons, one ribbon connected to the end of each of the arms and extending to the lever at the front of the vehicle, and a plurality of levers pivoted at their centers and having their ends connected to the forward ends of the ribbons and adapted to be engaged selectively and moved by the shifter lever to cause the selective shifting of the gears of the transmission.

5. In an operating means for the transmission of an automotive vehicle having an engine and a gear transmission at the rear of the vehicle and a shifter lever for the transmission at the front of the vehicle, a housing secured to the transmission, a plurality of concentric gear operators in the housing, means in the housing to mount the operators, arms independently connected at their centers to the operators to enable the independent operation of one operator with respect to the other, ribbons, one ribbon connected to the end of each of the arms and extending to the lever at the front of the vehicle, and a plurality of levers pivoted at their centers and having their ends connected to the forward ends of the ribbons and adapted to be engaged selectively and moved by the shifter lever to cause the selective shifting of the gears of the transmission.

6. In an operating means for the transmission of an automotive vehicle having an engine and a gear transmission at the rear of the vehicle and a shifter lever for the transmission at the front of the vehicle, a housing secured to the transmission, a plurality of gear operators in the housing, arms independently connected to the operators to enable the independent operation of one with respect to the other, a floor in the vehicle, a groove in the floor, a plurality of ribbons housed in the groove and connected to the arms and extending to the lever at the front of a vehicle, a plurality of levers pivoted at their centers and adapted to be engaged selectively and moved by the shifter lever to cause the selective shifting of the gears of the transmission.

7. In an operating means for the clutch and transmission of an automotive vehicle having an engine, a gear transmission and a clutch at the rear of the vehicle and shifter levers for the transmission and clutch at the front of the vehicle, a housing secured to the transmission, a tube journaled in the housing and having operable therefrom a means to shift the clutch, a second and longer tube nested in the first tube and having operable therefrom a means to shift a gear of the transmission into either of the two positions, a rod journaled in the second tube and having operable therefrom a means to shift another of the gears of transmission into either of two other selective positions, arms on the ends of said tubes and rod, ribbons connected to the arms and extending forwardly to the operating levers for the clutch and transmission, and means to connect the ribbon ends to the levers to enable the shifting of the gears of transmission and the operation of the clutch.

8. In an operating means for the clutch and transmission of an automotive vehicle having an engine, a gear transmission and a clutch at the rear of the vehicle and shifter levers for the transmission and clutch at the front of the vehicle, a housing secured to the transmission, a tube journaled in the housing and having operable therefrom a means to shift the clutch, a second and longer tube nested in the first tube and having operable therefrom a means to shift a gear of the transmission into either of the two positions, a rod journaled in the second tube and having operable therefrom a means to shift another gear of transmission into either of the two other selective positions, arms on the ends of said tubes and rod, a floor in the vehicle, grooves in the floor, a plurality of ribbons in the grooves in the floor, said ribbons being connected to the arms at one end and extending forward to the operating levers for the clutch and transmission, and means operatively to connect the ribbon ends to the levers to enable the shifting of the gears of transmission and the operation of the clutch.

9. In a means to shift the gears of transmission of an automotive vehicle having an engine and transmission at the rear, a shifter lever for the transmission mounted at the front of the vehicle, a plurality of arms concentrically pivoted adjacent the lever and having one set of the ends thereof immediately below the lever end, a yoke on each arm end adapted to be selectively engaged by the lever end, the engagement of the lever end in one of said yokes permitting the movement of one of the arms on its pivot, the pivot points of said lever and said arms being nonconcentric.

10. In a means for shifting the clutch and the gears of the transmission of an automotive vehicle having an engine positioned at the rear end of the vehicle, a transmission housing, clutch and gear shifter shafts slidably mounted in the transmission housing, a box secured to the transmission housing, a clutch tube journally mounted in said box and connected to the clutch shifter shaft, a gear shifter tube mounted in the clutch tube and being connected to one of the gear shifter shafts to move a gear of transmission into one of two selective positions, a gear shifter rod journaled in the gear shifter tube and being connected to one of the gear shifter shafts to shift a gear of the transmission into one of two selective positions, a means connecting the ends of the tubes and last named rod to operate the same from the front of the vehicle.

11. In a means for shifting the gears in the transmission of an automotive vehicle having the engine at the rear, a shifter lever adjacent the front seat, a dome in which said lever is mounted, a base for the dome, said base secured to the floor of the vehicle and covering an opening therein, two arms pivoted to the base substantially at their centers, one of said arms being longer than the other, said pivot arms having one of their ends immediately below the shifter lever, yokes on said arms adapted to be engaged by the shifter lever end, the movement of said shifter lever when in engagement with one of the yokes causing the movement of the arm on its pivot, and means to connect the ends of the arms to the shifter mechanism of the transmission to shift the transmission gears.

12. In a means for shifting the clutch and the gears of the transmission of an automotive vehicle having the engine, clutch, and transmission positioned at the rear of the vehicle, a transmission housing, concentric nested clutch and gear operators turnably mounted in the housing, means to operate the gears of the transmission and the clutch from one end of the said operators, and manipulatable individual means attached to the other ends of said operators and extending to the front of the vehicle to enable the operation of said operators selectively and independently.

ERIC OLLE SCHJOLIN.